United States Patent [19]

Balsells

[11] Patent Number: 4,964,204

[45] Date of Patent: * Oct. 23, 1990

[54] METHOD FOR MAKING A GARTER-TYPE AXIALLY-RESILIENT COIL SPRING

[75] Inventor: Peter J. Balsells, P.O. Box 15092, Santa Ana, Calif. 92705

[73] Assignees: Peter J. Balsells; Joan C. Balsells, both of Santa Ana, Calif.

[*] Notice: The portion of the term of this patent subsequent to Oct. 31, 2006 has been disclaimed.

[21] Appl. No.: 402,535

[22] Filed: Sep. 5, 1989

Related U.S. Application Data

[62] Division of Ser. No. 186,016, Apr. 25, 1988, abandoned.

[51] Int. Cl.$^5$ ........................... B21F 37/02; B21F 3/12
[52] U.S. Cl. ........................................... 29/173; 72/135
[58] Field of Search .................... 29/173; 72/135, 137, 72/371; 140/71 R, 88, 89; 267/1.5, 166, 166.1, 167, 180, 182

[56] References Cited

U.S. PATENT DOCUMENTS

| | | | |
|---|---|---|---|
| 1,473,446 | 11/1923 | Scott | 277/163 |
| 1,867,723 | 7/1932 | Adams | 267/167 |
| 2,610,846 | 9/1952 | Hanna | 267/1.5 |
| 3,323,785 | 6/1967 | Mather | 267/167 |
| 3,468,527 | 9/1969 | Mather | 267/167 |
| 4,655,462 | 4/1987 | Balsells | 267/167 X |
| 4,876,781 | 10/1989 | Balsells | 29/173 |

FOREIGN PATENT DOCUMENTS 2169378 7/1986 United Kingdom ............... 267/166

Primary Examiner—E. Michael Combs
Attorney, Agent, or Firm—Walter A. Hackler

[57] ABSTRACT

A garter-type axially resilient coil spring includes a plurality of coils canted along a centerline thereof with each coil having a trailing portion and a leading portion. Specific resilient performance, or load-deflection characteristics, of the spring is obtained by interconnecting the coils in a manner such that the trailing portion is disposed along an outside diameter of the garter-type axially resilient coil spring and the leading portion is disposed along an inside diameter of the garter-type axially resilient coil spring.

7 Claims, 3 Drawing Sheets

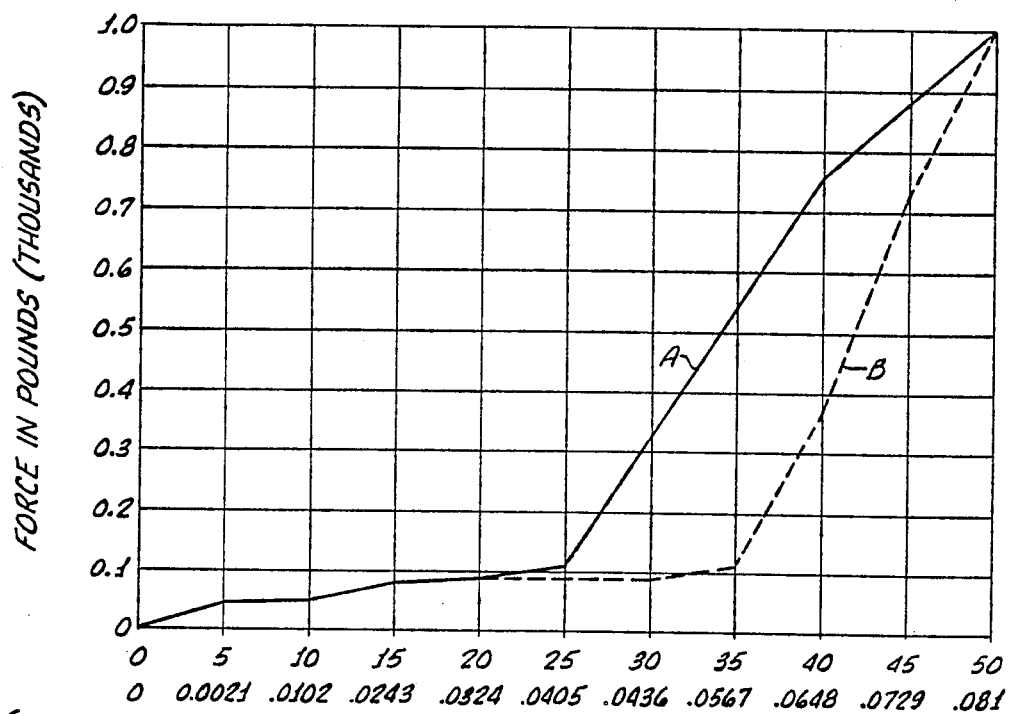
FIG. 4.    DEFLECTION IN PERCENT OF COIL HEIGHT
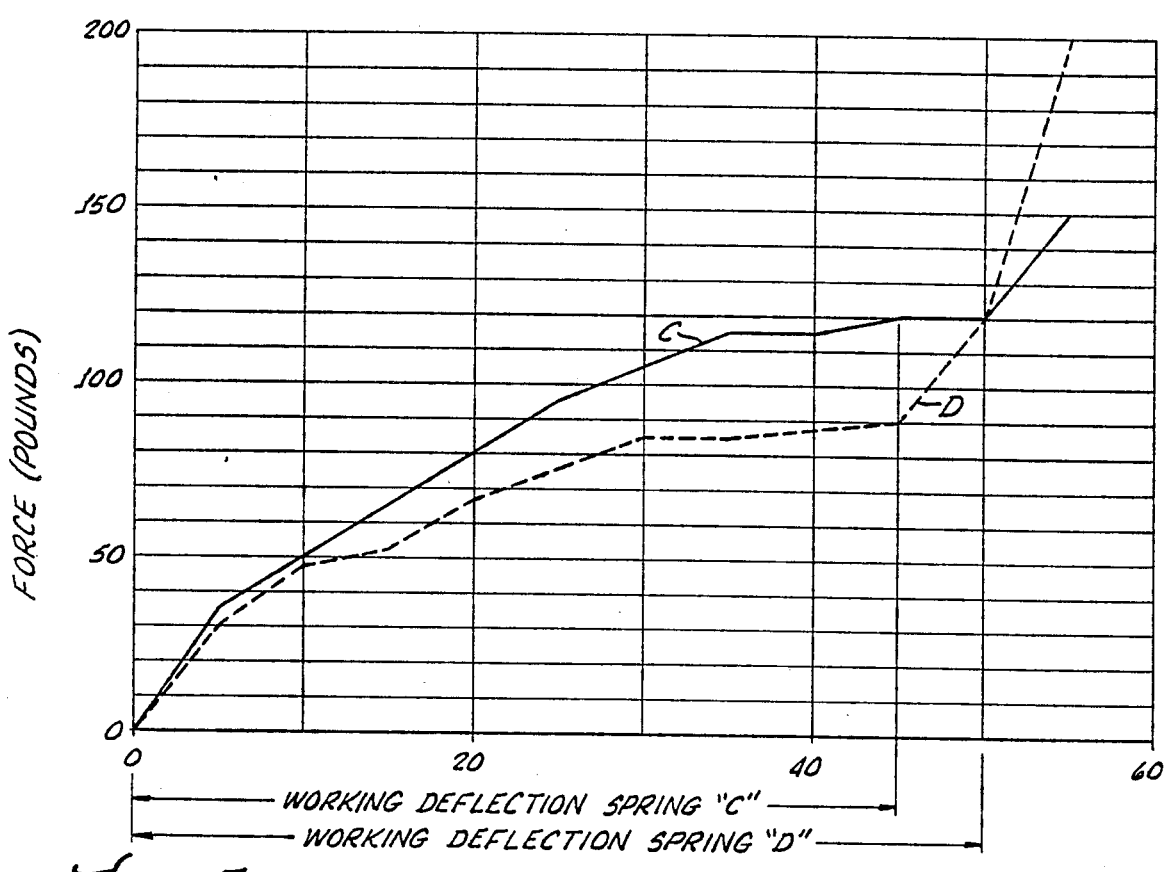
FIG. 5.    DEFLECTION (PERCENT)

METHOD FOR MAKING A GARTER-TYPE AXIALLY-RESILIENT COIL SPRING

This application is a division, of application Ser. No. 186,016, filed Apr. 25, 1988, now abandoned.

The present invention generally relates to a coil spring and seal and, more particularly, relates to garter-type coiled springs having canted coils which exhibit preselected resilient, or load-deflection, characteristics in response to axial loading of the springs.

Springs adapted for axial loading, by themselves or in conjunction with seals, are commonplace in the industry. Any number of pistons, bearings, pumps, clutches, and the like, may require annular, or garter-type, configuration, and many workers have investigated a great number of the design parameters which define the resilient characteristics of the spring. As an example, U.S. Pat. Nos. 3,323,735 and 3,468,527 to Mather are representative or garter-type springs specifically tailored for axial loading.

Because of the numerous applications in which garter-type springs may be utilized and the diverse load-deflection of characteristics demanded by each of those applications, careful design of each garter-type spring must be made in order to tailor the resilient characteristics thereof to meet the needs of the proposed application. For example, a spring designed for use in a seal, preferably has a working deflection in which the spring provides a substantially even or constant force over a broad range of deflection. With this resilient characteristic, variation in the distance between the sealed members, which may be caused by wear, does not affect the spring applied sealing pressure therebetween. Other applications require that the spring provide a linearly increasing force in response to deflection throughout a specified operating range, while in some cases even a negative load-deflection characteristic may be preferable.

Referring to U.S. Pat. No. 3,468,527, it is noted that Mather carefully studied spring characteristics in an effort to provide improved coiled spring constructions in which a wide variety of highly predictable load-deflection characteristics could be obtained to permit tailoring of the springs to the requirements of a wide variety of installations. Mather found that the ratio of the diameter of the coil to the diameter of the wire is a characteristic which can be varied to provide a range of load-deflection characteristics, while holding the profile angles of the spring constant.

Other investigators in most cases have fabricated garter-type springs by simply forming a conventional coil spring into a ring by welding or clamping the ends together. It should be appreciated that while garter-type, or annular, springs, as a class, have the same general shape, wide performance variations exist depending on the specific design of the spring. According to one classification, the annular spring may be either axial load bearing spring or radial load bearing spring As the classification implies, axial load bearing springs are designed for accommodating axial loading, while radial load bearing springs are designed for accommodating radial loading. The hereinabove referred to U.S. Pat. Nos. to Mather are exemplary of axial load bearing springs and U.S. Pat. No. 4,655,462 to Balsells discloses that annular, or garter-type springs, may be designed for radial loading thereof. The differences between the springs is substantial.

As an example, the useful purpose of "radial" type springs is their ability to deflect under radial loading. This is to be contrasted with the axially loaded springs of Mather which provides for a coil spring which is expected to remain radially stable under axial compression.

The present invention represents a substantial improvement in the design of garter-type axially loaded springs which provide for the tailoring of the resilient characteristics of the spring to a degree far beyond that possible heretofore. While the springs of the present invention may appear to be structurally similar to prior art springs and their performance comparable to other springs in many applications, their design characteristics can be controlled in order to enable springs to be used in applications not possible with heretofore annular springs. Further background with regard to axially resilient springs may be had from a reading of companion patent application Ser. Nos. 186,018, 268,217 and 408,686, now U.S. Pat. Nos. 4,826,144, 4,876,781 and 4,915,366, respectively.

For example, Mather in U.S. Pat. No. 3,468,527 primarily relies on a spring index which is the ratio of the diameter of the coil to the diameter of the wire to provide a means for adjusting the resilient characteristics of the spring. And, in U.S. Pat. No. 3,323,785, Mather teaches a variation of an angle of slant $\alpha$ which is formed by the intersection of the planes containing the diameters of the individual coils, with a plane normal to the axis of the coil, in order to alter the resilient characteristics of the spring. While these are useful parameters for tailoring the resilient characteristics of the spring, they are limited and do not provide for a spring which must be made of a specific wire diameter and coil size to accommodate predetermined dimensions in which a variation of the angle of slant o does not define a spring having the appropriate resilient characteristics desired.

The method and spring of the present invention overcomes the hereinabove identified deficiencies and heretofore known annular or garter-type axially loaded springs.

SUMMARY OF THE INVENTION

In accordance with the present invention, a garter-type axially resilient coiled spring includes a plurality of coils canted along a centerline thereof. Back angle means are provided not only for defining the disposition of a trailing portion of each coil with respect to a line normal to the centerline, but also for determining the force deflection characteristics, including the working resilient range, of the garter-type axially resilient coiled spring.

Heretofore, no one has recognized the importance of the spring back angle, hereinafter described in greater detail, and its dominant effect on spring performance. That is, by controlling the back angle which defines the trailing portion of each coil, the resilient characteristics can be designed to meet criteria heretofore not possible without the controlled selection and adjustment of the back angle.

Front angle means, hereinafter described in greater detail, are provided for defining the disposition of a leading portion of each coil with respect to the normal line. In each instance, the front angle means is greater than the back angle means.

The coils are interconnected in a manner forming a garter-type axially resilient coil spring with the trailing portion along an outside diameter of the garter-type axially resilient coil spring and the leading portion along an inside diameter of the garter-type axially resilient coil spring. This feature, in combination with the back angle means hereinabove described, provide for the capability of tailoring a garter-type axially resilient coil spring, in accordance with the present invention, to desired resilient characteristics beyond the range of a conventional garter-type axially resilient coil springs.

As an example, the trailing portion angle along the outside diameter of the spring can enable the spring to exert a greater force in response to a given deflection than a spring having the same dimensions and wire size with the trailing portion along the inside diameter of the spring, such as disclosed in U.S. Pat. Nos. 3,323,735 and 3,468,527. Consequently, springs of the present invention can be fabricated from smaller wire and have closer coil spacing while still exerting the same force in response to deflection as prior art springs.

This characteristic is important when the springs are needed in combination with a seal. Since the seals are generally made from a soft material, such as an elastomer or plastic, stress concentration is a prime consideration, and the lower the stress concentration, the longer the life that can be effected on the seal. That is, because springs, in accordance with the present invention, can exert more even force, compared to prior art springs, using smaller wire and closer spaced coils, the stress concentration on cooperating seal material is less. This results in more effective sealing and greater seal life.

More particularly, the garter-type axially resilient coil spring according to the present invention, may include a plurality of coils which are canted in a counterclockwise direction. Specifically, the back angle may be greater than one degree and less than 40 degrees, and the front angle may be greater than 15 degrees and less than 55 degrees. The back angle means defines a working deflection in which the garter-type axially resilient coil springs exerts a generally constant force in an axial direction in response to deflection of the garter-type axially resilient coil spring in the axial direction, with the working deflection being between about 5 percent and about 35 or more percent deflection of the spring. The back angle may be less than 40 degrees and selected to enable to the front angle to be less than 35 degrees which is beyond the range of any heretofore produced axially loaded garter-type springs.

In accordance with the present invention, a method for fabricating a garter-type axially resilient coil spring includes the steps of winding a wire to produce coils canted with respect to a centerline of the garter-type axially resilient coil spring, with each coil having a leading portion and a trailing portion. The wire may be wound so that the leading portion is disposed at a front angle to a line normal to the centerline of the garter-type axially resilient coil spring and the trailing portion is disposed at a back angle to the normal line.

During winding of the wire, the magnitude of the back angle can be adjusted in order to achieve preselected load-deflection characteristics of the garter-type axially resilient coil spring. It should be appreciated that while the back angle is specifically controlled, the corresponding front angle may vary depending on the coil spacing, that is the average distance between adjacent coils.

Thereafter, two ends of the wound wire are attached in a manner forming a garter-type axially resilient coil spring with a trailing portion along the outside diameter of the garter-type axially resilient coil spring and the leading portion along the inside diameter of the garter-type axially resilient coil spring.

More specifically, the wire may be wound in a counterclockwise direction and the coils may be canted in a counterclockwise direction with regard to the centerline. During winding of the coil, the back angle is adjusted to determine maximum load and the total deflection load point of the garter-type axially resilient coil spring, and the front angle may be held constant while adjusting the back angle.

The back angle may be made greater than one degree and less than 40 degrees and the front angle may be made greater than 15 degrees and less than 55 degrees. Alternatively, the back angle may be made less than 25 degrees and the front angle made less than 35 degrees.

BRIEF DESCRIPTION OF THE DRAWINGS

The advantages and features of the present invention will appear from the following description when considered in conjunction with the accompanying drawings in which:

FIG. 4 is a load versus deflection curve for the springs shown in FIGS. 2 and 3;

FIG. 5 shows load deflection curves for a variety of axially loaded counterclockwise springs with the trailing portion along the outside diameter thereof corresponding to the spring dimensions set forth in Table 1;

DETAILED DESCRIPTION

Figure 1:
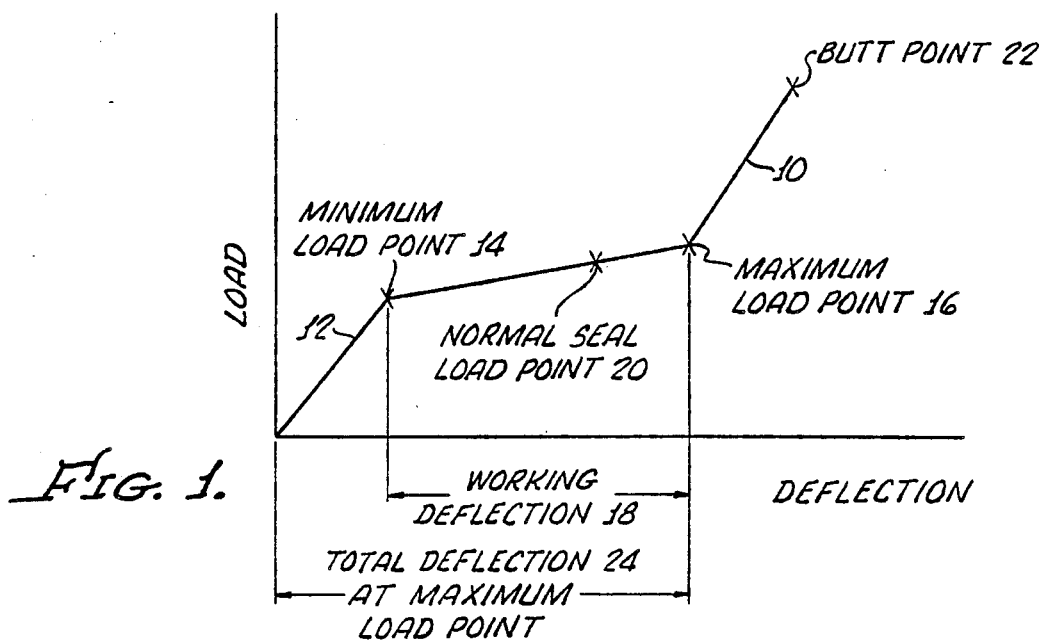
FIG. 1 is a theoretical load versus deflection curve illustrating the various parameters of an axially resilient coil spring.

Turning now to FIG. 1 there is shown an exemplary load deflection curve 10 for the purpose of illustrating the characteristics of canted coil garter-type axially resilient coiled springs, when the load is axially applied to the spring, the spring deflects in a generally linear fashion as shown by the line segment 12 until it reaches a minimum of load point 14 which represents the point at which, after the initial deflection, the load begins to remain relatively constant.

Between the minimum load point 14 and a maximum load point 16, the load deflection curve may be constant or show a slight increase as shown in FIG. 1. The area between the minimum load point 14 and maximum load point 16 is known as the working deflection range 18. The spring is normally loaded for operation within this range, as indicated by point 20, for a typical spring utilized in conjunction with a seal, gasket, or the like, for sealing purposes. Loading of the spring beyond the maximum load point 16 results in an abrupt deflection response until it reaches a butt point 22, which results in a permanent set in the spring as a result of overloading. Also indicated in FIG. 1, is the total deflection range 24, which is defined as the deflection between the unloaded spring and the deflection at the maximum load point 16.

Figure 2A:
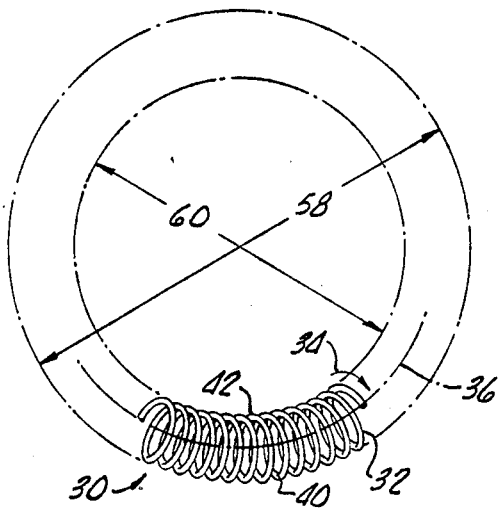
FIGS. 2a and b are plan and side views, respectively, of a circular welded clockwise wound spring with a back angle defining a trailing portion along the outside diameter of the spring and a front angle defining a leading portion along the inside diameter of the spring, in accordance with the present invention.
Figure 2B:
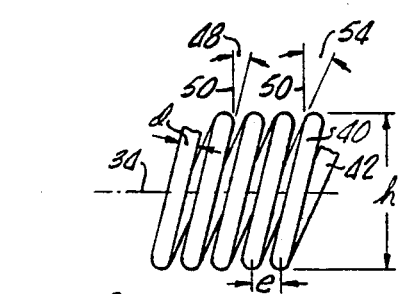

FIGS. 2a and 2b show a circular welded spring 30, in accordance with the present invention, generally showing a plurality of coils 32 wound in a clockwise fashion (see arrow 34) which are canted in a counterclockwise direction along a centerline 36 thereof.

As more clearly shown in FIG. 2b, each coil includes a trailing portion 40 and a leading portion 42, with the trailing portion having a back angle 48 which provides for means for both defining the disposition of the trailing portion 40 of each coil 32 with respect to a normal line 50 and for determining the working resilient range of the spring 30 as hereinafter described in greater detail.

In addition, a front angle 54 provides means for defining the disposition of the leading portion 42 of the coil 32 with respect to the normal line.

The spring 30 is formed by interconnecting the coils 32 in a manner forming a garter-type axially resilient coil spring with the trailing portion 40 along an outside diameter 58 (see FIG. 2a) of the spring 30 and the leading portion 42 along an inside diameter 60 of the spring 30.

As can be seen most clearly in FIG. 2b, the spring 30, in accordance with the present invention, always has a leading portion 40 disposed at a front angle 54, which is greater than the back angle 48 defining the trailing portion 40. That is, as the coil is traced in the circular-like manner about the centerline 32, each revolution includes a trailing portion and a leading portion, with the leading portion advancing movement along the centerline 36 more than the advancement along the centerline 36 when following the trailing portion 40 of the coil 32.

Figure 3A:
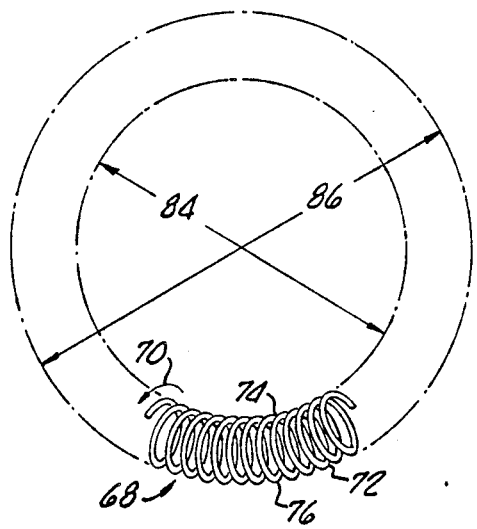
FIG. 3a and b are plan and side views, respectively, of a circular counter-clockwise wound spring having the same physical dimensions as the spring shown in FIG. 2a, 2b, also having a back angle defining a trailing portion along the outside diameter of the spring and a front angle defining a leading portion along an inside diameter of the spring.
Figure 3B:
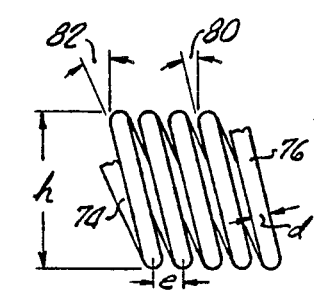

FIGS. 3a and 3b shows a circular welded spring 68, in accordance with the present invention, having the same physical dimensions and wire sizes as spring 30, shown in FIGS. 2a and 2b, with the spring 68 wound in a counter-clockwise fashion (see arrow 70). In this instance, the spring 68 includes a plurality of coils 72, each having a trailing portion 74 and a leading portion 76 which are defined, respectively, by a back angle 80 and a front angle 82, as shown in FIG. 3b.

Similar to spring 30, the coils 72 of spring 68 are interconnected in a manner forming a garter-type axially resilient coiled spring 68 in which the trailing portion falls along an outside diameter 86 and the leading portion falls along an inside diameter 84 of the spring 68.

The springs 30, 68, in accordance with the present invention, have an inside diameter of approximately 0.84 inches, a coil height (h) of approximately 0.162 inches, a coil spacing(s) of approximately 0.044 inches, with wire having a diameter(d) of 0.022 inches and a back angle of 14 degrees and a front angle of 25 degrees. These springs 30, 68 display different force-deflection performance than a prior art spring (not shown) having the same dimensions but with the trailing portion of the spring along the inside of the spring. This is demonstrated in FIG. 4 which presents a force in thousands of pounds versus the deflection of the coil in percent of the coil height.

Curve A of FIG. 4 represents the performance of the spring 30 or 68, while spring B represents the performance of a prior art spring identical in physical specification, but with the trailing portion along the outside of the spring. Although the two springs have almost identical force-deflection characteristics in their working deflection range, the maximum load points have a variation of about 40 percent.

It has been found that, in accordance with the present invention, the back angle can be varied from as little as one degree to 35 degrees as long as the front angle 54 is greater than the back angle and is larger than 20 degrees and less than 55 degrees. Variation in the back angle of the spring significantly affects the resilient characteristics of the spring independent of the front angle. This is shown in FIG. 5 which is a force-deflection curve for springs C and D having spring parameters set forth in Table 1.

Springs C and D are identical springs having the same wire diameter, spring inside diameter coil height and approximately the same front angle, but the back angle and correspondingly the coil spacing is varied. As can be seen in FIG. 5, the working deflection of spring D is approximately 50 percent whereas the working deflection of spring C is 45 percent. This is independent of the front angle. Hence, springs can be designed with varying resilient characteristics, such as the force required to deflect the spring, utilizing a spring having the same wire diameter inside diameter and coil height than was heretofore possible with only varying the front angle of the spring.

As hereinabove described, increased force-deflection characteristics can be used to advantage in conjunction with a sealant, or gasket materials, wherein the spring cavity is predetermined, the latter dictating spring I.D. and coil height.

TABLE 1

| Spring No. | Wire Dia. (d) (inches) | Spring I.D. (inches) | Coil Height (h) (inches) | Back Angle (degrees) | Front Angle (degrees) | Coil Spring(s) (inches) |
| --- | --- | --- | --- | --- | --- | --- |
| C | 0.022 | 0.840 | 0.161 | 10.5° | 38° | 0.043 |
| D | 0.022 | 0.840 | 0.161 | 16.25° | 38° | 0.032 |

TABLE 2

| Spring No. | Wire Dia. (d) (inches) | Spring I.D. (inches) | Coil Height (h) (inches) | Back Angle (degrees) | Front Angle (degrees) | Coil Spring(s) (inches) |
| --- | --- | --- | --- | --- | --- | --- |
| E | 0.016 | 0.850 | 0.163 | 11° | 21° | 0.016 |

TABLE 2-continued

| Spring No. | Wire Dia. (d) (inches) | Spring I.D. (inches) | Coil Height (h) (inches) | Back Angle (degrees) | Front Angle (degrees) | Coil Spring(s) (inches) |
|---|---|---|---|---|---|---|
| F | 0.016 | 0.850 | 0.163 | 27° | 38° | 0.016 |
| G | 0.016 | 0.850 | 0.163 | 34° | 45° | 0.016 |

Figure 6:
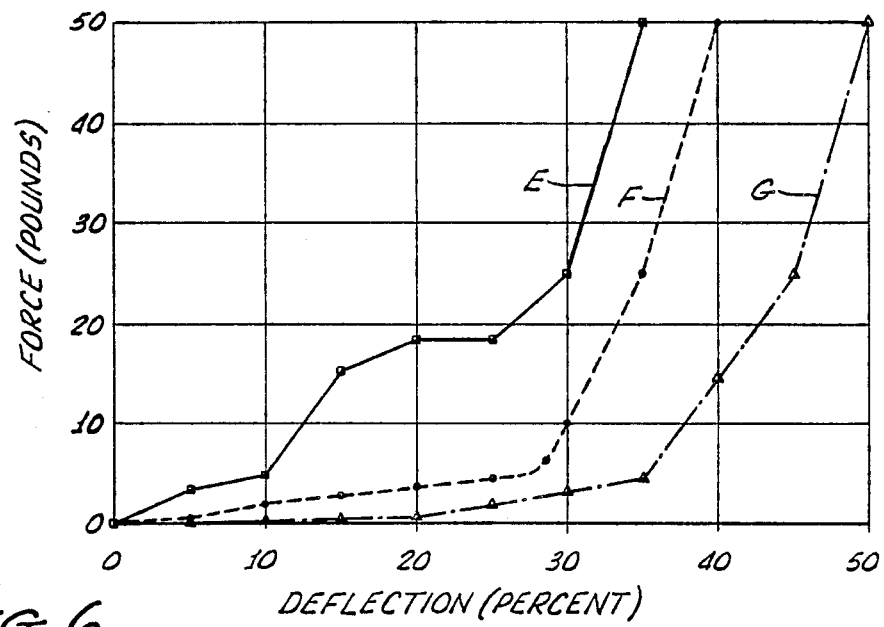
FIG. 6 shows load deflection curves for axially springs having different back angles.

When the coil spacing is held constant, the back angle along with the front angle may be varied to custom design a spring to tailor the resilient characteristics. For example, the smaller the back angle, the higher the force necessary to deflect the spring, as shown in FIG. 6, for Springs E, F and G defined in Table 2. This enables springs to be made with smaller wire and close coil spacing. Conversely, as the back angle is increased, the working deflection is increased when the coil spacing is held constant.

As shown in FIG. 6, spring E exhibits a substantially greater load in the working deflection area than spring G, which has greater back and front angles.

Figure 7:
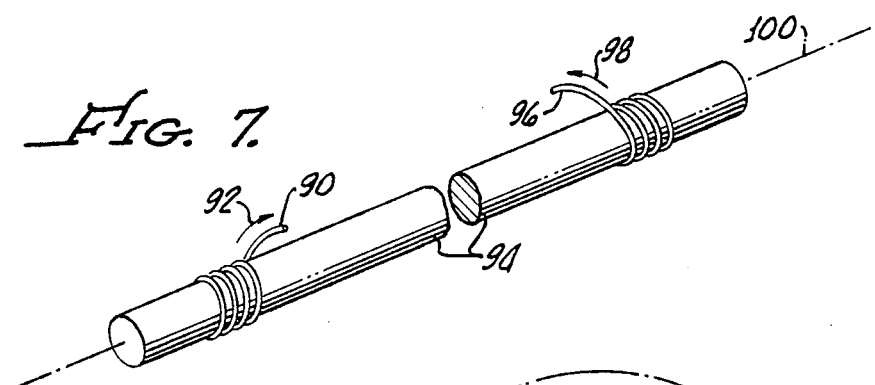
FIG. 7 is a depiction of the winding of a spring about a mandrel showing the spring being wound in a counterclockwise direction.

Turning to FIG. 7, there is shown a method for fabricating a garter-type axially resilient coil spring, in accordance with the present invention, by winding a wire 90 in a clockwise fashion, shown by the arrow 92, about a mandrel 94. Alternatively, a wire 96 may be wound in a counterclockwise direction, as shown by the arrow 98, about the mandrel 94 in FIG. 7.

Figure 8:
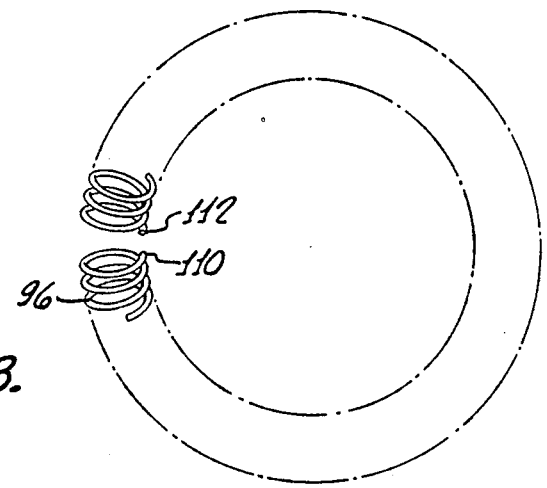
FIG. 8 is a perspective view showing a wound spring in a position for welding or attaching ends together to form a garter-type spring having a coil trailing portion along the outside diameter of the spring and a coil leading portion along the inside diameter of the spring.

It should be appreciated that the wire may be wound clockwise or counterclockwise and, accordingly, the coils may cant clockwise or counterclockwise. In either case, the performance is the same as long as the trailing edge of the formed garter-type spring 30 is disposed along the outside diameter of the spring 30. The wire 90 or 96 is wound around the mandrel 94 with respect to a centerline 100 thereof, so that each coil has a leading portion and a trailing portion as hereinbefore described, with each portion being defined, respectively, by a front angle and a back angle. During winding of the wire, the magnitude of the back angle is adjusted in order &.o achieve the preselected resiliency of the garter-type axially resilient coil spring 30. Following the winding of the wire 90 or 96, the ends 110, 112 of the wound wire are attached to form a garter-type axially resilient coiled spring with the trailing portion 40 along outside diameter of the spring 30 and the leading portion 42 along the inside diameter of the spring 30 as illustrated in FIG. 8.

Although there has been hereinabove described a specific arrangement of a coil spring, in accordance with the present invention, for the purposes of illustrating the manner in which the invention may be used to advantage, it should be appreciated that the invention is not limited thereto. Accordingly, any and all modifications, variations, or equivalent arrangements which may occur to those skilled in the art, should be considered to be within the scope of the invention, as defined in the appended claims.

What is claimed is:

1. A method for making garter-type axially resilient coiled spring comprising the steps of:
   fabricating by winding a metallic wire to produce coils canted with respect to a centerline of the garter-type axially resilient coiled spring, each coil having a leading portion and a trailing portion, said leading portion being disposed at a front angle, in a range from greater than 0 to 35 degrees, to a line normal to a centerline of the garter-type axially resilient coiled spring and said trailing portion being disposed at a back angle to the normal line;
   during fabricating of the wire adjusting the magnitude of the back angle in order to achieve preselected load-deflection characteristics of the garter-type axially resilient coiled spring; and
   attaching two ends of the wound wire in a manner forming a garter-type axially resilient coiled spring with the trailing portion along the outside diameter of the garter-type axially resilient coiled spring and the leading portion along the inside diameter of the garter-type axially resilient coiled spring.

2. The method according to claim 1 wherein the wire is fabricated in a counterclockwise direction and the coils are canted in a counterclockwise direction with respect to the centerline.

3. The method according to claim 1 wherein the back angle is adjusted to determine the maximum load and the total deflection maximum load point o the garter-type axially resilient coiled spring.

4. The method according to claim 3 wherein the front angle is held constant while adjusting the back angle.

5. The method according to claim 1 wherein the back angle is made greater than one degree and less than 40 degrees and the front angle is made greater than 15 degrees and less than 55 degrees.

6. The method according to claim 1 wherein the back angle is made less than 25 degrees.

7. The method according to claim 1 or 6 wherein the front angle is made less than 35 degrees.

* * * * *